Figure 1:
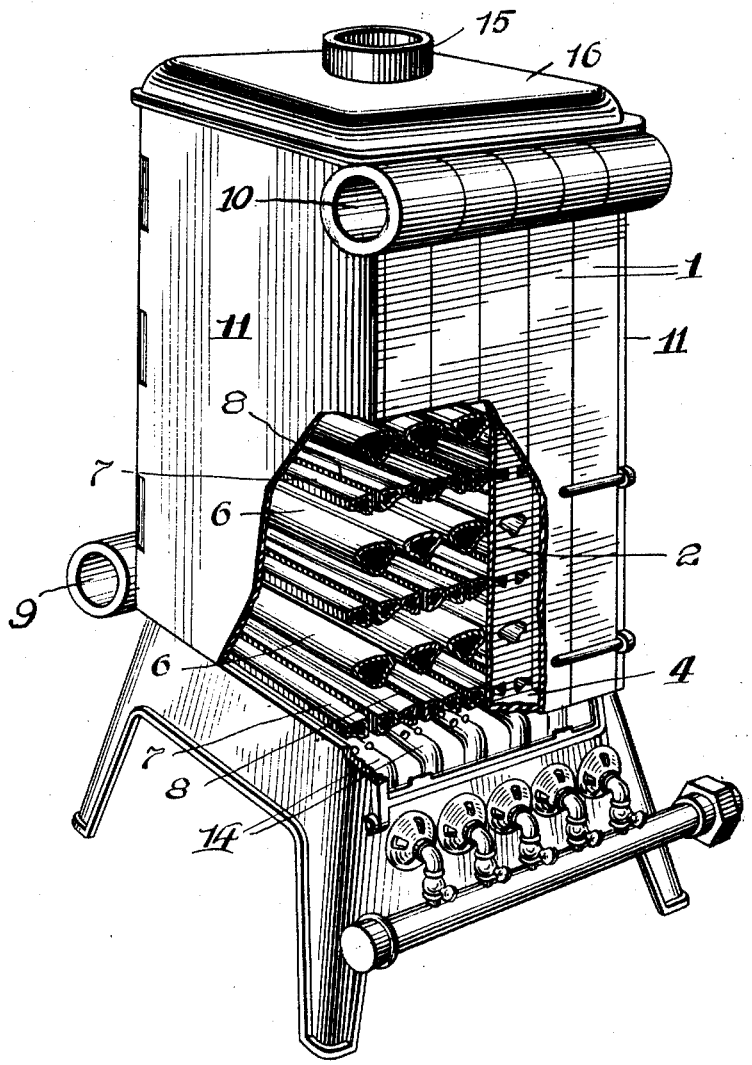

C. H. HOOK.
HEATER.
APPLICATION FILED OCT. 11, 1912.

1,081,306.

Patented Dec. 16, 1913.
2 SHEETS—SHEET 1.

WITNESSES
Samuel Payne
K. H. Butler

INVENTOR
C. H. Hook.

Att'ys

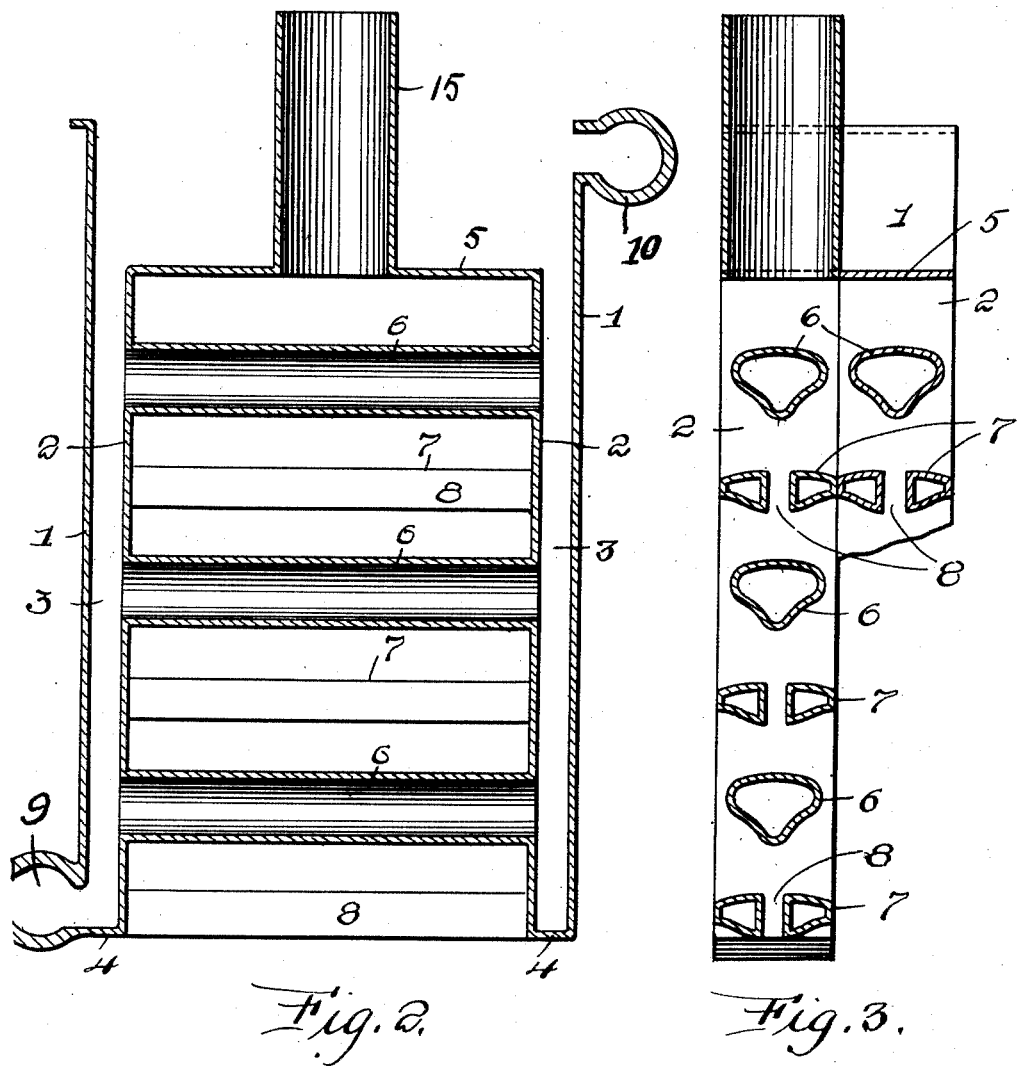

UNITED STATES PATENT OFFICE.

CHARLES HOWARD HOOK, OF PITTSBURGH, PENNSYLVANIA.

HEATER.

1,081,306.

Specification of Letters Patent.

Patented Dec. 16, 1913.

Application filed October 11, 1912. Serial No. 725,187.

*To all whom it may concern:*

Be it known that I, CHARLES HOWARD HOOK, a citizen of the United States of America, residing at Pittsburgh, in the county of Allegheny and State of Pennsylvania, have invented certain new and useful Improvements in Heaters, of which the following is a specification, reference being had therein to the accompanying drawing.

This invention relates to heaters, and the objects of my invention are to provide a water heater or steam generator that can also be utilized for heating a compartment, and to provide heating units that can be assembled as a furnace or large heater for heating water circulated throughout a building for various purposes.

Other objects of my invention are to provide a compact furnace unit that presents a large area or surface that permits of water being quickly heated with a minimum expenditure of fuel, and to provide a structure wherein water is circulated and thoroughly heated by passing through the structure.

Further objects of my invention are to provide a heater unit having longitudinal superimposed water conduits, all of which are shaped to baffle and deflect heat units or products of combustion, and to arrange the heater units so that the longitudinal water conduits of one unit will coöperate with the conduits of another unit in providing a baffled path for products of combustion.

With the above and other objects in view the invention resides in the novel construction, combination and arrangement of parts to be hereinafter specifically described and then claimed.

Reference will now be had to the drawings, wherein like numerals denote corresponding parts throughout the several views, in which:—

Figure 1 is a perspective view of a heater or furnace, partly broken away and partly in section, Fig. 2 is a longitudinal sectional view of one of the heater units, and Fig. 3 is a cross sectional view of the same.

A heater in accordance with this invention comprises outer end walls 1 and inner end walls 2, the walls 2 being spaced apart from the walls 1 and arranged in parallelism therewith to provide vertical water conduits 3. The lower edges of the walls 1 and 2 are connected together by base plates 4 and the walls 2 are of a less height than the walls 1 and are connected together by a longitudinal top plate 5. The inner walls 2 are connected by longitudinal spaced apart water conduits that establish communication between the conduits 3 at the ends of the heater unit. The longitudinal conduits are in the form of pipes 6 that are heart-shaped in cross section and sets of hollow bars 7 that are sector-shaped in cross section. The bars 7 are arranged in sets to provide central longitudinal flues or slots 8, the walls of which are parallel. The bars have the outer walls flush with the sides of the heater unit and said bars are so shaped that the heater unit can be easily molded. By reference to Fig. 3, it will be observed that the bars of one heater unit contact with the bars of an adjoining heater unit, the contacting bars forming a concave deflector that deflects heat units into the flues 8. The pipes 6 are located directly above the flues 8 and the contracted or double concave lower side of each pipe serves as a deflector. The pipes 6 are of less width than the heater unit and when heater units are assembled, as shown in Fig. 3, there is a space between the pipes 6. Now considering the pipes and bars of assembled units, it will be observed that there is a staggered, baffled or sinuous passage from the lower end of the heater to the top thereof and with the heated gases or products of combustion passing upwardly around the pipes and bars, said pipes and bars are thoroughly heated. The pipes and bars present a large heating area to the contents thereof and the water entering the bottom of the heater is quickly heated before it reaches the top of the heater. The end walls 1 are provided with hollow enlargements, the enlargements for the rear end walls being arranged at the lower ends thereof and indicated at 9, while the enlargements for the front end walls are arranged at the top thereof and indicated at 10. The enlargements register as clearly shown in Fig. 1. The enlargements 9 provide a water inlet opening, while the enlargements 10 provide a water outlet opening. When a plurality of the heating units are assembled, side plates 11 are employed as clearly shown in Fig. 1.

To take care of the products of combustion, fumes, etc., from burners 14 located beneath the heater units, one of the heater units is provided with an outlet pipe or flue 15, carried by the top plate 5. This flue can extend through a cover plate 16 located upon the top of the heater units.

From the foregoing it will be observed that a heater or furnace, as shown in Fig. 1, has end compartments for water and a top compartment adjacent to the outlet pipe 13. With the pipes and bars establishing communication between the end compartments of the heater, a large volume of water can be easily and quickly heated.

It is apparent that a large number of the heater units can be readily assembled for use in connection with a large hot water radiating system, or that a single unit can be provided with side plates, whereby the heater unit can be used in a bath room for heating the room, besides heating water to be used in the bath room.

While in the drawings there is illustrated a preferred embodiment of the invention, it is to be understood that the structural elements are susceptible to such variations and modifications as fall within the scope of the appended claims.

What I claim is:—

1. A heater comprising a plurality of units, each of said units consisting of a pair of hollow end walls, one of said walls provided with means to constitute an inlet and the other of said walls provided with means to constitute an outlet, superposed pipes connecting said inner walls together and each substantially heart-shaped in cross section, said pipes communicating with said conduits, pairs of hollow bars arranged below each of said pipes and communicating with said conduits, the pipes of each pair being spaced from each other and each pipe of a pair gradually decreasing in height outwardly.

2. A heater comprising a plurality of units, each of said units consisting of a pair of hollow end walls, one of said walls provided with means to constitute an inlet and the other of said walls provided with means to constitute an outlet, superposed pipes connecting said inner walls together and each substantially heart-shaped in cross section, said pipes communicating with said conduits, pairs of hollow bars arranged below each of said pipes and communicating with said conduits, the pipes of each pair being spaced from each other and each pipe of a pair gradually decreasing in height outwardly, and the pairs of bars of one unit abutting against the pairs of bars of the other unit.

In testimony whereof I affix my signature in the presence of two witnesses.

CHARLES HOWARD HOOK.

Witnesses:
   Max H. Srolovitz,
   Katherine Errett.